H. & C. Littlefield,
Bread Machine.
N° 67,202. Patented July 30, 1867.
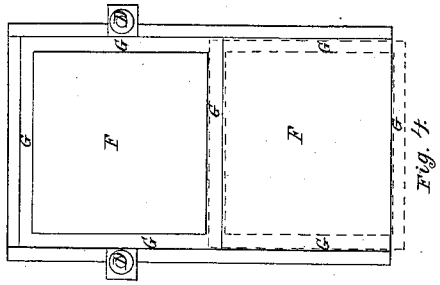
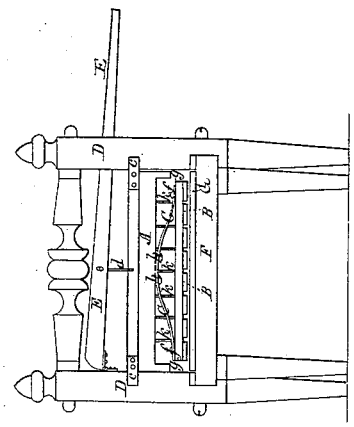
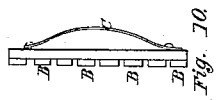
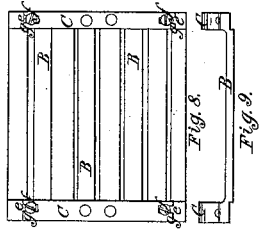
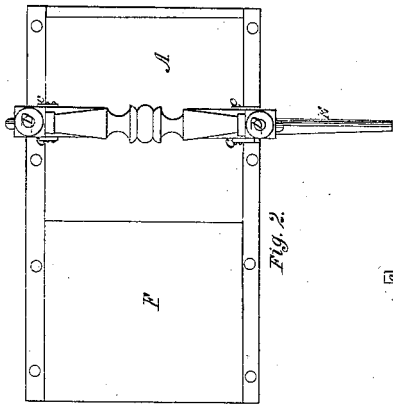
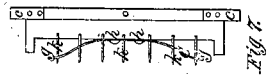
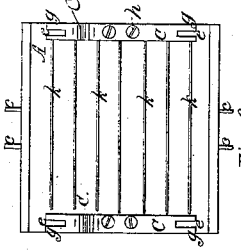
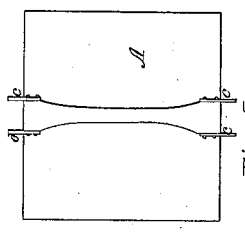
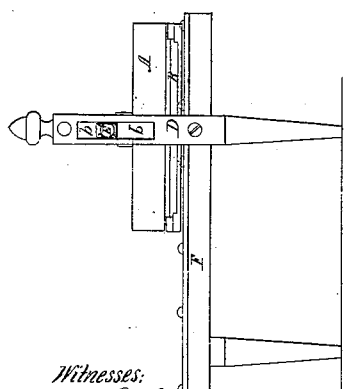
Witnesses:
John E. Crane
Alvin Laurence
Inventors:
Hiram Littlefield
Charles Littlefield

United States Patent Office.

HIRAM LITTLEFIELD AND CHARLES LITTLEFIELD, OF TEWKSBURY, MASSACHUSETTS.

Letters Patent No. 67,202, dated July 30, 1867.

---

IMPROVED CORN-CAKE MACHINE.

---

*The Schedule referred to in these Letters Patent and making part of the same.*

---

TO ALL WHOM IT MAY CONCERN:

Be it known that we, HIRAM LITTLEFIELD and CHARLES LITTLEFIELD, both of Tewksbury, in the county of Middlesex, and State of Massachusetts, have invented certain new and useful improvements in the Machines which are used for Pressing and Marking or Cutting or Stamping Corn-Cake, which is a composition of broken or cracked, parched, or roasted corn, and candied, or partly candied, molasses; and we hereby declare that the following is a full, clear, and exact description of our said improvements, reference being had to the accompanying drawings, making part of this specification, in which—

Figure 1 is a side elevation.
Figure 2, a plan.
Figure 3, an end view.
Figure 4, a plan of the table and former or pressing-frame, after the pressing and marking or cutting devices have been removed.
Figure 5 is a top side,
Figure 6, a bottom side, and
Figure 7 an end elevation of the movable cutter-head or stamping-follower.
Figure 8 is a top side view,
Figure 9, an edge view, and
Figure 10 an end view of the pressing-follower; all of which pertain to our said invention.

Our invention consists in a movable cutter-head or stamping-follower, which has a series of blades secured to and projecting downwards from its under side, in combination with a series of stationary bars, which constitute a pressing-follower, which is suspended beneath the stamping-follower by suitable springs secured to the stamping-follower or the pressing-follower, and having slots in their ends working or sliding on screws or bolts, the heads of which engage with the springs at each side of the slots in their ends to raise the pressing-follower. When the stamping-follower is raised said springs, acting on the top of the pressing-follower, causes the same to press hard on the corn-cake, or other substance under operation, in advance of the blades, or before said blades can be depressed so as to come in contact with the substance under operation, to cut, mark, or stamp the same.

In the drawings, A is the movable cutter-head or stamping-follower, having a series of blades, $k$, projecting downward from its under side. A pressing-follower, composed of stationary bars B, is suspended beneath the stamping-follower by any suitable springs, C, which, in the present case, are semi-elliptic, and fastened at or near their centres to the stamping-follower by screws $h$. The ends $g$ of these springs are provided with slots $e$ and screws or bolts $f$ passing through said slots, and, entering the substance of the pressing-follower, connect the two followers together. The stamping-follower is guided up and down between the posts by jaws, $c$, and moved by means of a lever, E, and connecting-link $d$, or other suitable device, said lever being hinged or pivoted to one of the posts D, and guided by a slot or mortise, $b$, made through the opposite post. The corn cake to be pressed and stamped, cut, or marked is placed upon the table F, within the former or pressing-frame G, said frame being withdrawn from beneath the pressing and stamping-device to a position shown in red lines in fig. 4. This frame, with the corn cake, is then moved forward directly beneath the pressing and stamping-device, and weight applied to the outer end of the lever E forces the pressing and stamping-device downward on to the corn-cake. The stationary or unyielding bars, which constitute the pressing-follower, presses said corn cake in a suitable manner, and the blades $k$, on the stamping-follower A, stamp, cut, or mark the corn cake so that it may be easily broken for packing, transportation, or sale. The springs C must be considerably stiff, so as to press hard on the substance under operation before the blades have reached the same or come in contact therewith, and so as to withdraw the blades from contact with the substance before the pressing-follower rises. After the followers have been lifted from the corn cake, or other substance, the frame G, containing the cake, may be drawn back, turned round, and replaced, to cut the cake the other way, and again drawn back and the cake removed, when the machine is ready for another operation.

Thus it will be readily seen that the corn cake may be evenly, suitably pressed, and stamped, cut, or marked for packing, transportation, or sale; whereas in the ordinary machine for cutting corn cake the knives or blades are stationary, and single movable yielding guides are placed between them, and when brought down on to the cake some of the yielding guides yield more than others, and none bear or press on the cake to any extent until the blades come in contact with or enter said cake, consequently the cake cut by the ordinary machine will be very uneven, and difficult to pack for transportation the same weight in boxes of the same capacity.

We are aware that a machine has been patented by William Manning for pressing and cutting corn cake, wherein separate, disconnected, and unequally yielding bars or pressing devices are used, and wherein a former is claimed in combination with such disconnected and adjustable clearers and knives for cutting. We wish it to be distinctly understood that we disclaim having invented the equivalent in principle, construction, or operation, either the unequally yielding bars or the combination of such bars with a cutting device; but what we do claim as new, and desire to secure by Letters Patent, is—

1. The pressing-follower, when constructed as shown and described, viz, with stationary or unyielding bars B, and arranged to operate as and for the purpose specified.

2. And in combination with the pressing-follower, constructed as described, the stamping-follower A and blades $k$, springs C, and pressing-frame G, in the manner and for the purpose set forth.

HIRAM LITTLEFIELD,
CHARLES LITTLEFIELD.

Witnesses:
T. S. WHITNEY,
R. B. NEVERS,
JOHN E. CRANE,